United States Patent [19]

Ewing

[11] Patent Number: 5,108,238
[45] Date of Patent: Apr. 28, 1992

[54] TORQUE LIMITING BOLT FOR POWER WRENCH TIGHTENING

[76] Inventor: Paul E. Ewing, 32005 Alameda, Farmington Hills, Mich. 48336

[21] Appl. No.: 672,416

[22] Filed: Mar. 20, 1991

[51] Int. Cl.⁵ .................... F16B 31/00; F16B 33/04; B25B 17/00
[52] U.S. Cl. ........................ 411/5; 411/405; 411/919; 81/55
[58] Field of Search ................ 411/1–5, 411/402, 405, 410, 919; 81/55, 56

[56] References Cited

U.S. PATENT DOCUMENTS

| | | | |
|---|---|---|---|
| 2,928,302 | 3/1960 | Owen et al. | 411/2 |
| 3,138,987 | 6/1964 | Wing | 411/4 |
| 4,403,529 | 9/1983 | Ikeda et al. | 81/56 |
| 4,565,112 | 1/1986 | Fujita et al. | 81/56 |
| 4,637,764 | 1/1987 | Imai | 411/5 |
| 4,659,267 | 4/1987 | Uno et al. | 411/5 |
| 4,836,063 | 6/1989 | Fushiya | 81/55 |

FOREIGN PATENT DOCUMENTS 1229443  4/1971  United Kingdom ............... 411/402

*Primary Examiner*—Neill R. Wilson
*Attorney, Agent, or Firm*—Reising, Ethington, Barnard, Perry & Milton

[57] ABSTRACT

A torque limiting bolt for tightening by a power wrench comprises a threaded shank, a tightening head at one end of the shank, a retaining head at the other end of the shank and a nut in threaded engagement with the threaded shank, the tightening head being an eight point head having sixteen external facets of equal size and uniform spacing around the circumference of the head. The power wrench is provided with oppositely rotatable inner and outer sockets engaging the driving head and the nut, respectively, the inner socket being an eight point socket having sixteen internal facets.

3 Claims, 2 Drawing Sheets

TORQUE LIMITING BOLT FOR POWER WRENCH TIGHTENING

FIELD OF THE INVENTION

This invention relates to threaded fasteners adapted for tension controlled tightening; more particularly, it relates to torque limiting bolts of the type in which the driving head is twisted off when a predetermined value of torque is applied.

BACKGROUND OF THE INVENTION

Torque limiting bolts are used in many applications where it is required to provide a certain tension in the shank upon the tightening. A well known example is in the bolting of steel plates or beams in the construction industry. In such applications, the installation of a bolt is commonly made with access to one side only of the parts to be joined and the bolt and nut are tightened by a power wrench. In this application, the bolt is provided with a retaining head at one end of the shank and a tightening head at the other end. The threaded portion of the shank adjacent the tightening head receives a conventional nut, such as a hex head nut. The power wrench, typically a nonimpacting electric wrench, has a chuck with an inner socket for receiving the tightening head and an outer socket which receives the nut. The sockets are counter-rotated by the wrench for tightening the nut onto the bolt. The bolt is provided with a shear neck or twist-off neck to provide tension control in the tightening of the bolt. When the torque reaches a predetermined value the tightening head is twisted off the bolt shank.

The use of a power wrench for installation of such torque limiting bolts is highly efficient and lends itself to high productivity due to the use of a power wrench requiring only one hand for operation to install the bolt. This is highly advantageous in hard-to-reach installations such as those frequently encountered by steel workers. In practical application of such a fastener installation system, a difficulty has been encountered which tends to detract from the advantages gained by the power wrench installation. The difficulty is that the tightening head of the bolt tends to bind or jam in the socket and after it is twisted off and it is not ejected from the socket. The conventional bolt is provided with a twelve point head of standard configuration. This head mates with the inner socket in a loose fit to facilitate easy mating engagement. The size of the head will vary from its nominal dimension by the allowable manufacturing tolerances. In order to accommodate the largest head which is within tolerance, the inner socket must be somewhat larger to provide a proper fit. This relationship results in an undesirably loose fit in the case of the smallest head which is within manufacturing tolerance. It is believed that this extreme case of looseness allows relative rotation between the head and the socket which results in a camming action as the nut is tightened. The camming action between the facets of the head and the socket results in a binding or jamming of the head in the socket so that it cannot be ejected with the normal ejection force of the tool and the socket has to be cleared of the head by manual force.

A general object of this invention is to provide an improved torque limiting bolt which coacts with a driving socket in such a manner as to overcome certain disadvantages of the prior art.

SUMMARY OF THE INVENTION

In accordance with this invention, a torque limiting bolt is provided with an improved head configuration to minimize jamming of the twist-off head in the socket of a power wrench. This is accomplished by providing a torque limiting bolt with an eight point twist-off head which coacts with an eight point power driven socket.

Further, in accordance with the invention, a torque limiting bolt comprises a unitary body including a threaded shank, a tightening head at one end of the shank and a retaining head at the other end of the shank and a nut on the shank for clamping bodies between the retaining head and the nut, the tightening head being joined with the shank by a torque control neck; the power wrench has power driven, oppositely rotatable, inner and outer sockets engaging the driving head and the nut, respectively. The tightening head is an eight point head and the inner socket is an eight point socket and the power wrench is operative to tighten the nut on the bolt until the tightening head is twisted off the shank by the torque applied by the inner socket.

A complete understanding of this invention may be obtained from the detailed description that follows taken with the accompanying drawings.

BEST MODE FOR CARRYING OUT THE INVENTION

Figure 1:
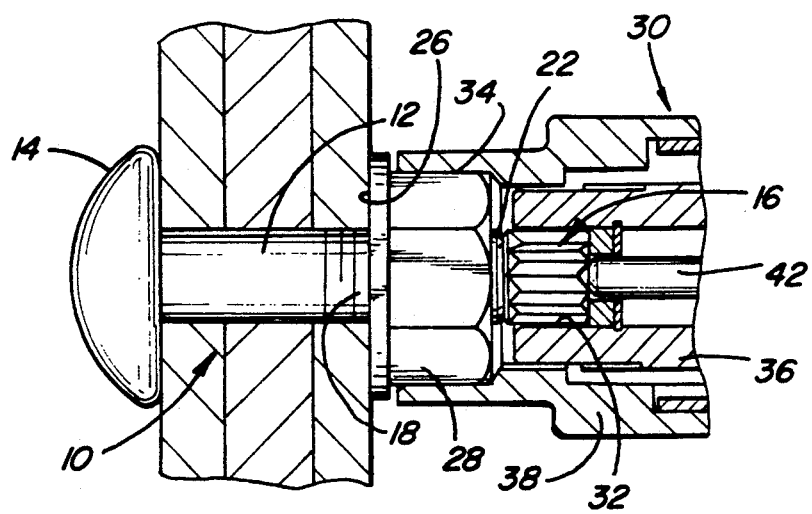
FIG. 1 shows the bolt of this invention in an initial stage of installation by a power wrench.
Figure 2:
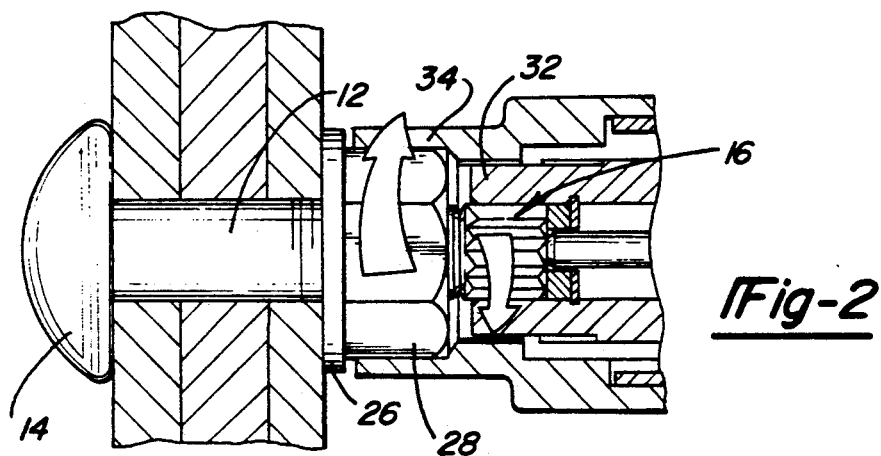
FIG. 2 shows the installation of the bolt in an intermediate stage.

Referring now to the drawings, there is shown an illustrative embodiment of the invention in a torque limiting bolt. It will be appreciated as the description proceeds that the invention may be used in bolts of other configurations for various applications.

This invention will first be described, in general, with reference to FIGS. 1 and 5. The bolt 10 comprises, in general, a unitary metal body having a cylindrical shank 12, a retaining head 14 at one end and a driving or tightening head 16 at the other end. The shank 12 is provided with threads 18 at the portion adjacent the tightening head 16. The shank 12 at the outer end of the threads 18 is joined with the tightening head 16 by a torque control neck 22 which transmits torque from the tightening head to the shank. The bolt 10 is made by roll forming from a cylindrical blank in accordance with known manufacturing techniques.

The torque control neck 22 is of circular cross-section and has a cross-sectional area which is less than the cross-sectional area of the tightening head 16 and less than that of the shank 12. The neck 22 defines an annular groove of nonuniform diameter with the minimum diameter being approximately midway between the adjacent ends of the tightening head 16 and the shank 12. The neck 22 has a torsional breaking strength less than that of the shank and less than that of the tightening head 16.

Figure 5:
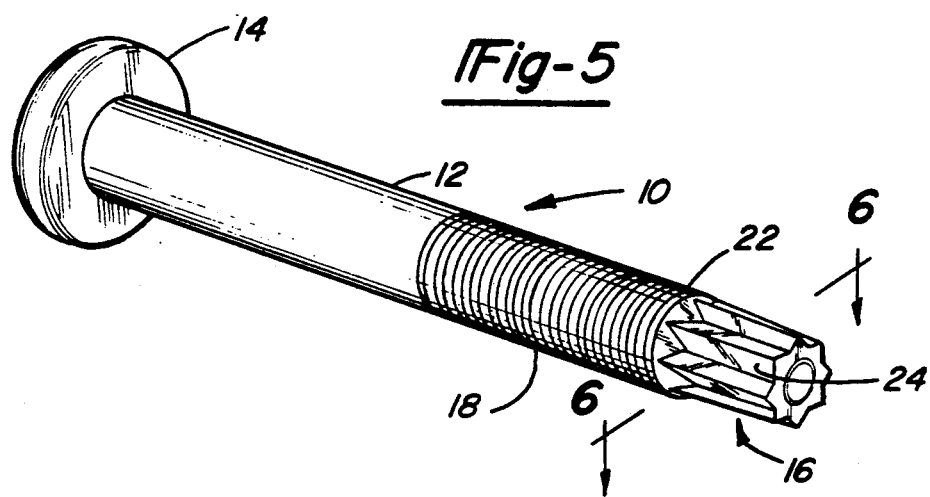
FIG. 5 shows a perspective view of the bolt of this invention.
Figure 6:
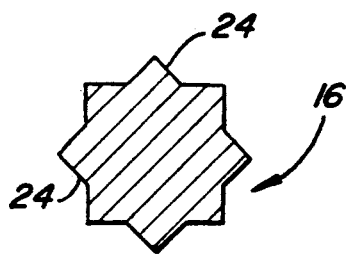
FIG. 6 shows a cross-section taken on lines 6—6 of FIG. 5.

As will be described in greater detail subsequently, the tightening head 16 is an eight point head and, as shown in FIGS. 5 and 6, it has the configuration defined in *Fastener Standards*, Fifth Edition, Industrial Fasteners Institute, Cleveland, Ohio 1970. The head 16 is a splined shaft and is adapted to receive a conventional socket wrench as a torque applying tool. The external surface of the head 16 is provided with sixteen external flats or facets 24 which are of equal size and are uniformly spaced around the circumference of the head. The facets intersect at eight equally spaced points around the circumference and form equal internal angles of sixty degrees.

As shown in FIGS. 1 through 4, the torque limiting bolt 10 is tightened by a power wrench 30 of known construction. In the example of installation shown in FIGS. 1 through 3, the bolt 10 is used for bolting three steel plates together. The bolt shank 12 is passed through a hole in the plates with the retaining head 14 seated against one outer plate. A washer 26 is placed on the bolt shank and seated against the other outer plate and a hex nut 28 is threadedly engaged with the threads 18 on the bolt shank. The bolt 10 is constructed so that the tightening head 16 will shear from the shank 12 at the torque control neck 22 when a predetermined value of torque is applied. This provides the desired tensile stress in the bolt for the particular application.

Figure 3:
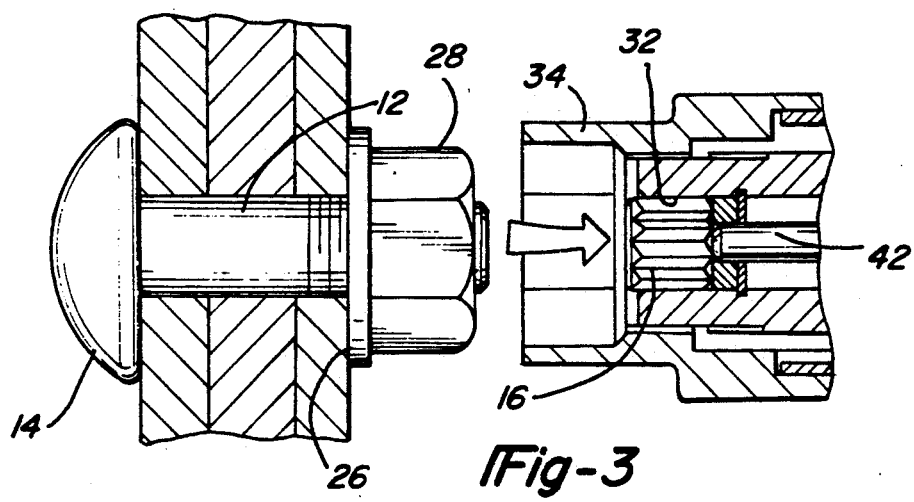
FIG. 3 shows the final stage of installation of the bolt.
Figure 4:
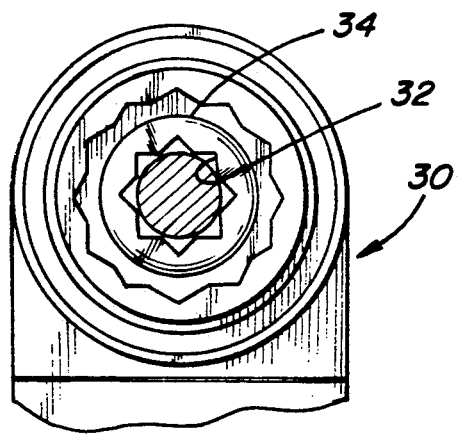
FIG. 4 is an end view of the chuck of the wrench showing the inner and outer sockets.

The power wrench 30, a fragment of which is shown in FIGS. 1 through 4, is typically powered by a nonreversible electric motor. It comprises an inner socket 32 which is adapted to mate with the tightening head 16 of the bolt. It also comprises an outer socket 34 which mates with the hex nut 28. The inner socket is driven in one direction, as indicated by the arrow in FIG. 2 by a drive shaft 36 and the outer socket 34 is driven in the opposite direction by the outer shaft 38. When the wrench trigger (not shown) is actuated and the drive motor is energized, the outer socket 34 rotates the nut 28 in the tightening direction and, simultaneously, the inner socket 32 rotates the tightening head 16 in the tightening direction. This counter-rotation produces tension in the bolt and when the torque applied to the tightening head reaches a predetermined value, the tightening head is sheared off from the shank 12 at the torque control neck 22. The power wrench is then withdrawn, as shown in FIG. 3, from the bolt and the ejecting pin 42 pushes the tightening head 16 out of the inner socket 32.

In the bolt 10 of this invention, the eight point head 14 is comprised of eight splines with two facets 24 per spline, the splines being angularly displaced at increments of forty-five degrees. Accordingly, the operator of the power wrench can readily receive the tightening head 16 in the inner socket 32 by only slight rotation of the wrench to obtain proper alignment. The eight point head has a significantly larger area per facet, for a given head length and diameter, than a twelve point head; even with the reduced number of facets, the pressure, assuming face-to-face contact between the head facets and the opposing socket facets, for a given applied torque is less with the eight point head than with the twelve point head. Accordingly, there is less tendency for the head to bind or jam in the socket with the twelve point head.

Figure 7:
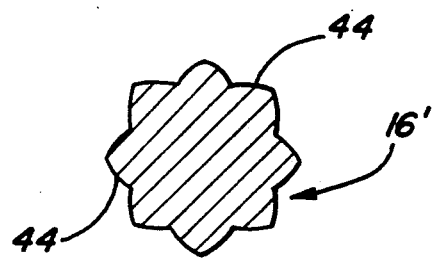
FIG. 7 shows a cross-section of a modified head of the bolt of FIG. 5.

A modification of the invention is illustrated in FIG. 7. In this modification, an eight point tightening head 16' is provided with arcuate facets 44 instead of flat facets. The arcuate facets on the eight point head 16' decrease the tendency of the head to bind or jam in the socket. The arcuate facets 44 provide a line contact between the facet 44 of the head and the opposed flat facet of the socket upon initial engagement at low torque. As the torque is increased, there is a surface deformation in the area of engagement whereby the contact area increases. However, there is less tendency to bind between the engaging facets with the arcuate indentation over a broader area than in the case of the indentation concentrated at the tip of flat engaging facets. For the purpose of minimizing binding and jamming of the head in the socket, the arcuate facets 44 should have a radius of curvature which is a segment of an approximately circular arc with a radius of curvature which is at least two times the chord length of the arcuate surface.

Although the description of this invention has been given with reference to a particular embodiment, it is not to be construed in a limiting sense. Many variations and modifications of the invention will now occur to those skilled in the art. For a definition of the invention, reference is made to the appended claims.

What is claimed is:

1. In combination, for fastening two members together,
    a torque limiting bolt comprising a unitary body including a threaded shank, a tightening head at one end of the shank and a retaining head at the other end of the shank, the tightening head being joined with said shank by a torque control neck having a torsional breaking strength less than the other portions of said body,
    a nut in threaded engagement with said threaded shank for clamping two bodies between said retaining head and nut,
    and a power wrench having power driven oppositely rotatable inner and outer sockets engaging said tightening head and said nut respectively, and having an ejecting pin for pushing the tightening head out of the inner socket after the torque control neck is broken,
    the improvement comprising:
    said tightening head being an eight point head having sixteen external facets of equal size and uniform spacing around the circumference of the head and said inner socket being an eight point head having sixteen internal facets for mating engagement with said tightening head whereby binding between the tightening head and the inner socket is alleviated for facilitating ejection of the tightening head.

2. In combination, for fastening two members together,
    a torque limiting bolt comprising a unitary body including a threaded shank, a tightening head at one end of the shank and a retaining head at the other end of the shank, the tightening head being joined with said shank by a torque control neck having a torsional breaking strength less than the other portions of said body,
    a nut in threaded engagement with said threaded shank for clamping two bodies between said retaining head and nut,
    and a power wrench having power driven oppositely rotatable inner and outer sockets engaging said tightening head and said nut respectively, and having an ejecting pin for pushing the tightening head out of the inner socket after the torque control neck is broken, the improvement comprising:

said tightening head being an eight point head having sixteen external facets of equal size and uniform spacing around the circumference of the tightening head, each of said facets of said tightening head being a convex facet having a convex arcuate surface which is arcuate in the plane extending transversely of said tightening head, said arcuate surface being a segment of an approximately circular arc, said inner socket being an eight point head having sixteen internal flat facets of equal size and uniform spacing around the circumference of said socket, each of said flat facets being in face-to-face opposition with one of the convex facets when said tightening head is in mating engagement with said socket whereby binding between the tightening head and the inner socket is alleviated for facilitating ejection of the tightening head.

3. The invention as defined in claim 2 wherein said circular arc has a radius which is at least two times the chord length of the arcuate surface.

* * * * *